(12) United States Patent
Takii et al.

(10) Patent No.: US 10,636,302 B2
(45) Date of Patent: Apr. 28, 2020

(54) VEHICLE ILLUMINATION DEVICE, VEHICLE AND ILLUMINATION CONTROL SYSTEM

(71) Applicant: KOITO MANUFACTURING CO., LTD., Tokyo (JP)

(72) Inventors: Naoki Takii, Shizuoka (JP); Masashi Yamazaki, Shizuoka (JP); Naoki Tatara, Shizuoka (JP); Toshihiro Okamura, Shizuoka (JP); Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/064,788

(22) PCT Filed: Dec. 21, 2016

(86) PCT No.: PCT/JP2016/088227
§ 371 (c)(1),
(2) Date: Jun. 21, 2018

(87) PCT Pub. No.: WO2017/110935
PCT Pub. Date: Jun. 29, 2017

(65) Prior Publication Data
US 2019/0012911 A1   Jan. 10, 2019

(30) Foreign Application Priority Data
Dec. 22, 2015   (JP) .................................. 2015-249881

(51) Int. Cl.
*G08G 1/0965*   (2006.01)
*B60Q 1/50*   (2006.01)
(Continued)

(52) U.S. Cl.
CPC ............. *G08G 1/0965* (2013.01); *B60Q 1/00* (2013.01); *B60Q 1/50* (2013.01); *B60W 30/00* (2013.01);
(Continued)

(58) Field of Classification Search
CPC .. G08G 1/0965; B60Q 2300/42; B60Q 1/085; B60Q 1/143; B60Q 1/1423; H01L 2224/48091
See application file for complete search history.

(56) References Cited

U.S. PATENT DOCUMENTS 6,343,869 B1 *   2/2002   Kobayashi ............. B60Q 1/085
362/37
8,456,325 B1 *   6/2013   Sikora .................... G08G 1/087
340/909
(Continued)

FOREIGN PATENT DOCUMENTS

EP    2944532 A2    11/2015
JP    9-35185 A     2/1997
(Continued)

OTHER PUBLICATIONS

Search Report dated Mar. 21, 2017 by the International Searching Authority in counterpart International Patent Application No. PCT/JP2016/088227 (PCT/ISA/210).
(Continued)

*Primary Examiner* — Orlando Bousono
(74) *Attorney, Agent, or Firm* — Sughrue Mion, PLLC

(57) ABSTRACT

An illumination device installed in a vehicle capable of traveling in an automatic driving mode is provided with an illumination unit configured so as to radiate light outward from the vehicle, and an illumination control unit configured so as to control the illumination unit, on the basis of an illumination control signal sent from transportation infra-
(Continued)

structure, which is provided with a light-emitting body for radiating light outward, in order to make the illumination state of the illumination unit correspond to the illumination state of the light-emitting body.

9 Claims, 8 Drawing Sheets

(51) Int. Cl.
*B60Q 1/00* (2006.01)
*B60W 30/00* (2006.01)
*G08G 1/0967* (2006.01)
*G08G 1/01* (2006.01)
*G08G 1/16* (2006.01)

(52) U.S. Cl.
CPC ......... *G08G 1/0112* (2013.01); *G08G 1/0116* (2013.01); *G08G 1/096716* (2013.01); *G08G 1/096783* (2013.01); *G08G 1/096791* (2013.01); *G08G 1/163* (2013.01); *G08G 1/164* (2013.01)

(56) References Cited

U.S. PATENT DOCUMENTS

| | | | | |
|---|---|---|---|---|
| 2002/0105432 A1* | 8/2002 | Pederson | ............. | B60Q 1/2611 340/815.45 |
| 2005/0062937 A1* | 3/2005 | Imade | ............. | F21S 6/003 353/31 |
| 2005/0231381 A1* | 10/2005 | Pederson | ............. | B60Q 1/2611 340/815.45 |
| 2006/0056855 A1* | 3/2006 | Nakagawa | ............. | G09F 9/33 398/183 |
| 2006/0083011 A1* | 4/2006 | Buhr | ............. | H05B 33/0845 362/466 |
| 2006/0139184 A1* | 6/2006 | Hong | ............. | G01C 21/3626 340/995.1 |
| 2006/0145824 A1* | 7/2006 | Frenzel | ............. | G01S 17/026 340/426.26 |
| 2006/0238368 A1* | 10/2006 | Pederson | ............. | B60Q 1/2611 340/815.45 |
| 2007/0091634 A1* | 4/2007 | Sakurada | ............. | B60Q 1/0011 362/555 |
| 2007/0262882 A1* | 11/2007 | Yamamoto | ............. | B60Q 1/1423 340/933 |
| 2008/0101077 A1* | 5/2008 | Watanabe | ............. | B60Q 1/1423 362/466 |
| 2008/0130302 A1* | 6/2008 | Watanabe | ............. | B60Q 1/085 362/466 |
| 2008/0136661 A1* | 6/2008 | Pederson | ............. | B60Q 1/2611 340/815.45 |
| 2008/0144326 A1* | 6/2008 | Watanabe | ............. | B60Q 1/085 362/466 |
| 2008/0225550 A1* | 9/2008 | Sakurada | ............. | B60Q 1/0011 362/554 |
| 2009/0072996 A1* | 3/2009 | Schoepp | ............. | B60Q 1/1423 340/903 |
| 2011/0260886 A1 | 10/2011 | Nagura et al. | | |
| 2011/0292673 A1* | 12/2011 | Aono | ............. | B60Q 1/0011 362/553 |
| 2012/0027253 A1* | 2/2012 | Dai | ............. | H05B 37/0227 382/103 |
| 2012/0062127 A1* | 3/2012 | Tsai | ............. | H05B 33/0842 315/151 |
| 2012/0074725 A1* | 3/2012 | Jeon | ............. | B60R 13/02 296/1.08 |
| 2012/0158254 A1* | 6/2012 | Takagaki | ............. | B60Q 1/085 701/49 |
| 2012/0275140 A1* | 11/2012 | Feinbloom | ............. | F21L 14/00 362/105 |
| 2013/0127340 A1* | 5/2013 | Huhn | ............. | B60Q 1/0041 315/77 |
| 2013/0194565 A1* | 8/2013 | Sorensen | ............. | G01N 21/55 356/73 |
| 2014/0042966 A1* | 2/2014 | Masuda | ............. | B60L 11/1818 320/109 |
| 2014/0097748 A1* | 4/2014 | Kato | ............. | B60Q 9/008 315/77 |
| 2014/0233250 A1* | 8/2014 | Lee | ............. | B60Q 1/0023 362/465 |
| 2014/0300464 A1* | 10/2014 | Chen | ............. | B60Q 1/46 340/471 |
| 2014/0369058 A1* | 12/2014 | Foltin | ............. | B60Q 1/085 362/466 |
| 2015/0151669 A1* | 6/2015 | Meisner | ............. | B60Q 1/085 701/49 |
| 2016/0061588 A1* | 3/2016 | Cho | ............. | H04M 1/7253 356/614 |
| 2016/0257248 A1* | 9/2016 | Lisseman | ............. | B60K 37/06 |

FOREIGN PATENT DOCUMENTS

| | | |
|---|---|---|
| JP | 9-277887 A | 10/1997 |
| JP | 2011-227761 A | 11/2011 |
| JP | 2014-130409 A | 7/2014 |
| JP | 2015-186944 A | 10/2015 |

OTHER PUBLICATIONS

Written Opinion dated Mar. 21, 2017 by the International Searching Authority in counterpart International Patent Application No. PCT/JP2016/088227 (PCT/ISA/237).

Communication dated Sep. 9, 2019, from the European Patent Office in counterpart European Application No. 16878822.2.

* cited by examiner

VEHICLE ILLUMINATION DEVICE, VEHICLE AND ILLUMINATION CONTROL SYSTEM

TECHNICAL FIELD

The present disclosure relates to a vehicle illumination device. In particular, the present disclosure relates to a vehicle illumination device provided to a vehicle capable of traveling in an automatic driving mode. Also, the present disclosure relates to a vehicle having a vehicle illumination device, and an illumination control system including the vehicle.

BACKGROUND ART

Currently, research on an automatic driving technique of an automobile has been actively conducted in each country, and each country is considering the legislation so as to enable a vehicle (hereinafter, a "vehicle" refer to an automobile) to travel in an automatic driving mode on public roads. Here, in the automatic driving mode, a vehicle system automatically controls travelling of a vehicle. Specifically, in the automatic driving mode, the vehicle system performs at least one of a steering control (control a travelling direction of the vehicle), a brake control and an accelerator control (control of braking and acceleration/deceleration of the vehicle) based on various information obtained from a camera, a sensor, a radar and the like. On the other hand, in a manual driving mode to be described later, a driver controls the travelling of the vehicle, as in most of conventional vehicles. Specifically, in the manual driving mode, the travelling of the vehicle is controlled in conformity with a driver's operation (a steering operation, a braking operation, and an accelerator operation), and the vehicle system does not automatically perform the steering control, the brake control and the accelerator control. Meanwhile, the driving mode of the vehicle is not a concept existing only in some vehicles but a concept existing in all vehicles including conventional vehicles having no automatic driving function. For example, the driving mode of the vehicle is classified in accordance with a vehicle control method or the like.

Thus, in the future, it is expected that vehicles travelling in the automatic driving mode (hereinafter, appropriately referred to as "automatic driving vehicle") and vehicles travelling in the manual driving mode (hereinafter, appropriately referred to as "manual driving vehicle") coexist on public roads. Particularly, in a situation where the vehicles travelling in the automatic driving mode and the vehicles travelling in the manual driving mode coexist, it is preferable that a state of road-to-vehicle communication between the automatic driving vehicle and a traffic infrastructure equipment is presented to an outside, from a standpoint of safety.

Patent Document 1 discloses an automatic follow-up travelling system in which a following vehicle can automatically follow a preceding vehicle. In the automatic follow-up travelling system, each of the preceding vehicle and the following vehicle has a display device, character information for preventing the other vehicle from intruding between the preceding vehicle and the following vehicle is displayed on the display device of the preceding vehicle, and character information indicative of the automatic follow-up travelling mode is displayed on the display device of the following vehicle.

PRIOR ART DOCUMENT

Patent Document

Patent Document 1: JP-A-H09-277887

SUMMARY

Problem to be Solved

Patent Document 1 does not consider a vehicle illumination device and an illumination control system capable of presenting information, which indicates that a host vehicle capable of traveling in the automatic driving mode is performing communication with the traffic infrastructure equipment under specific situations (for example, a situation at an intersection point), toward an outside such as other vehicle, a pedestrian and the like.

An object of the present disclosure is to provide a vehicle illumination device capable of presenting information, which indicates that a host vehicle capable of traveling in an automatic driving mode is performing communication with a traffic infrastructure equipment, toward an outside such as other vehicle, a pedestrian and the like. Another object of the present disclosure is to provide a vehicle having the vehicle illumination device and an illumination control system including the vehicle.

Means for Solving the Problem

A vehicle illumination device according to an aspect of the present disclosure is provided to a vehicle capable of traveling in an automatic driving mode. The vehicle illumination device includes:

an illumination unit configured to irradiate light toward an outside of the vehicle; and an illumination control unit configured to control the illumination unit based on an illumination control signal transmitted from a traffic infrastructure equipment having a light-emitting body configured to irradiate light toward an outside, such that an illumination state of the illumination unit corresponds to an illumination state of the light-emitting body.

According to the above configuration, it is possible to provide the vehicle illumination device capable of presenting information, which indicates that the vehicle capable of traveling in the automatic driving mode is performing communication with the traffic infrastructure equipment, toward an outside such as other vehicle, a pedestrian and the like. In other words, it is possible to visualize a state of road-to-vehicle communication between the vehicle and the traffic infrastructure equipment by the vehicle illumination device. For example, since the pedestrian and the like can check safety of the vehicle by seeing the information indicating that the vehicle is performing communication with the traffic infrastructure equipment, the pedestrian can cross in relief a crosswalk and the like. Also, since a driver of the other vehicle can check safety of the vehicle by seeing the information indicating that the vehicle is performing communication with the traffic infrastructure equipment, the driver can pass in relief an intersection point and the like or overtake in relief the vehicle.

Also, the illumination control unit may be configured to control the illumination unit to blink in synchronization with the light-emitting body.

According to the above configuration, the pedestrian and the like can perceive that the vehicle is performing communication with the traffic infrastructure equipment by seeing a situation where the illumination unit is blinking in synchronization with the light-emitting body.

Also, the illumination control unit may be configured to control the illumination unit such that an illumination color of the illumination unit corresponds to an illumination color of the light-emitting body.

According to the above configuration, the pedestrian and the like can perceive that the vehicle is performing communication with the traffic infrastructure equipment by seeing a situation where the illumination color of the illumination unit corresponds to the illumination color of the light-emitting body.

Also, a vehicle capable of traveling in an automatic driving mode may be provided which includes the vehicle illumination device, a first wireless communication unit configured to receive the illumination control signal, and a vehicle control unit configured to control traveling of the vehicle.

According to the above configuration, it is possible to provide the vehicle capable of presenting information, which indicates that the vehicle capable of traveling in the automatic driving mode is performing communication with the traffic infrastructure equipment, toward an outside such as other vehicle, a pedestrian and the like.

An illumination control system according to an embodiment of the present disclosure includes:
  the vehicle; and
  a traffic infrastructure equipment including:
    a light-emitting body including a light-emitting unit configured to irradiate light toward an outside; and
    a communication device including a control signal generation unit configured to generate the illumination control signal and a second wireless communication unit configured to wirelessly transmit the illumination control signal.

According to the above configuration, it is possible to provide the illumination control system capable of presenting information, which indicates that the vehicle capable of traveling in the automatic driving mode is performing communication with the traffic infrastructure equipment, toward an outside such as other vehicle, a pedestrian and the like.

Also, the light-emitting body may further include:
  a third wireless communication unit configured to receive the illumination control signal; and
  a light emission control unit configured to control the light-emitting unit based on the illumination control signal such that an illumination state of the light-emitting unit corresponds to an illumination state of the illumination unit.

According to the above configuration, based on the illumination control signal transmitted from the communication device, at the traffic infrastructure equipment-side, the light-emitting unit is controlled such that the illumination state of the light-emitting unit corresponds to the illumination state of the illumination unit, and at the vehicle-side, the illumination unit is controlled such that the illumination state of the illumination unit corresponds to the illumination state of the light-emitting unit. Thus, the pedestrian and the like can more easily perceive an aspect where the illumination state of the traffic infrastructure equipment-side and the illumination state of the vehicle-side correspond to each other.

Also, when the vehicle exists within a predetermined range from the communication device, the first wireless communication unit may receive the illumination control signal from the second wireless communication unit.

According to the above configuration, the vehicle existing within the predetermined range from the traffic infrastructure equipment (communication device) can present information, which indicates that the vehicle is performing communication with the traffic infrastructure equipment, toward an outside such as other vehicle, a pedestrian and the like. Accordingly, the pedestrian and the like in the vicinity of the traffic infrastructure equipment can check the safety of the vehicle by seeing the information.

Also, the light-emitting body may be arranged at an intersection point or in the vicinity thereof, and the communication device may be arranged in the vicinity of the intersection point.

According to the above configuration, the vehicle existing within the predetermined range from the intersection point can present the information, which indicates that the vehicle is performing communication with the traffic infrastructure equipment, toward an outside such as other vehicle, a pedestrian and the like. Accordingly, the pedestrian and the like in the vicinity of the intersection point can check safety of the vehicle by seeing the information and can cross in relief a crosswalk and the like.

Also, the vehicle may be a group of vehicles traveling in a row traveling mode,
  the light-emitting body may be arranged in plural at an outer side of a road on which the group of vehicles is traveling, and
  the illumination control unit of each vehicle may be configured to control the corresponding illumination unit such that an illumination pattern formed by the illumination units of the group of vehicles corresponds to an illumination pattern formed by the light-emitting units of the plurality of light-emitting bodies.

According to the above configuration, it is possible to provide the illumination control system capable of presenting information, which indicates that the group of vehicles traveling in the row traveling mode is performing communication with the traffic infrastructure equipment, toward an outside such as other vehicle, a pedestrian and the like. For example, since a driver of the other vehicle traveling behind the vehicle can check safety of the group of vehicles by seeing that the illumination pattern formed by the group of vehicles and the illumination pattern formed by the plurality of light-emitting bodies correspond to each other, the driver can overtake in relief the vehicle.

Effects

According to the present disclosure, it is possible to provide the vehicle illumination device capable of presenting the information, which indicates that the host vehicle capable of traveling in the automatic driving mode is performing communication with the traffic infrastructure equipment, toward an outside such as a driver of the other vehicle, a pedestrian, and the like.

DETAILED DESCRIPTION OF EMBODIMENTS

Figure 1A:
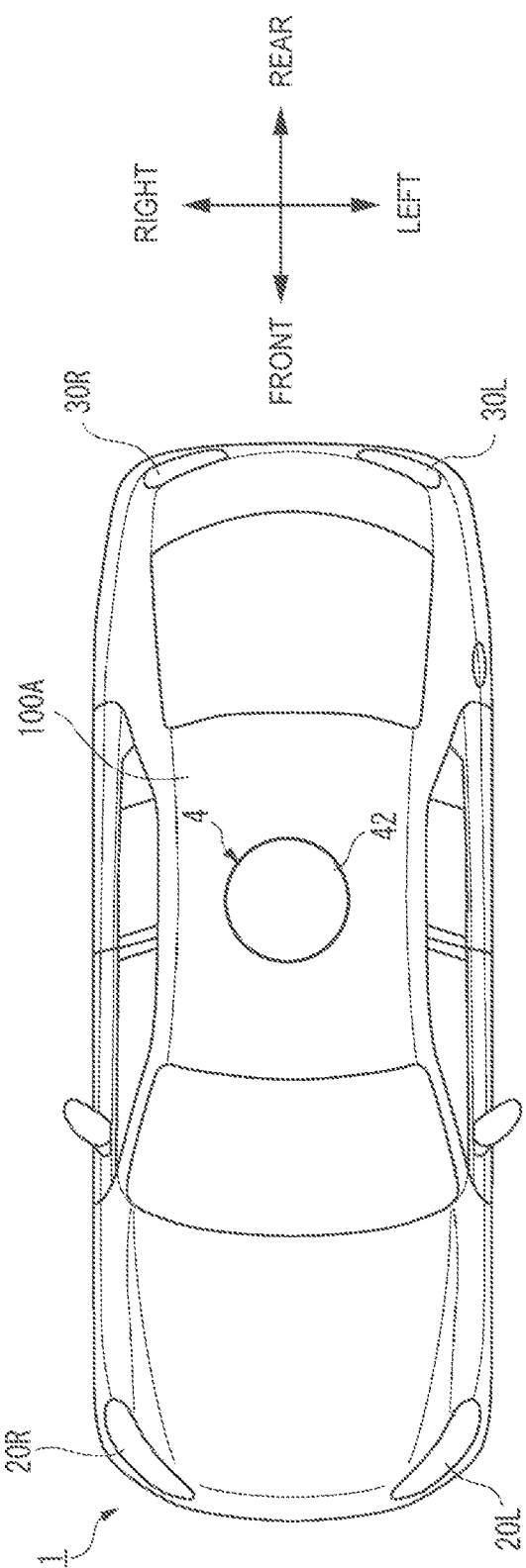
FIG. 1A is a plan view of a vehicle in which a vehicle illumination device according to an embodiment of the present invention is mounted.

Hereinafter, an embodiment of the present disclosure (hereinafter, referred to as "the embodiment") will be described with reference to the drawings. Meanwhile, in the below, for the sake of convenience of description, the description of members having the same reference numerals as those already described in the description of the embodiment will be omitted. Also, for the sake of convenience of description, dimensions of the respective members shown in the drawings may be different from actual dimensions of the respective members.

Also, in the description of the embodiment, for the sake of convenience of description, "the right and left direction", "the front and rear direction" and "the vertical direction" will be appropriately mentioned. The directions are relative directions set with respect to a vehicle 1 shown in FIG. 1. Here, "the vertical direction" is a direction including "the upward direction" and "the downward direction". "the front and rear direction" is a direction including "the forward direction" and "the rearward direction". "the right and left direction" is a direction including "the leftward direction" and "the rightward direction".

Figure 1B:
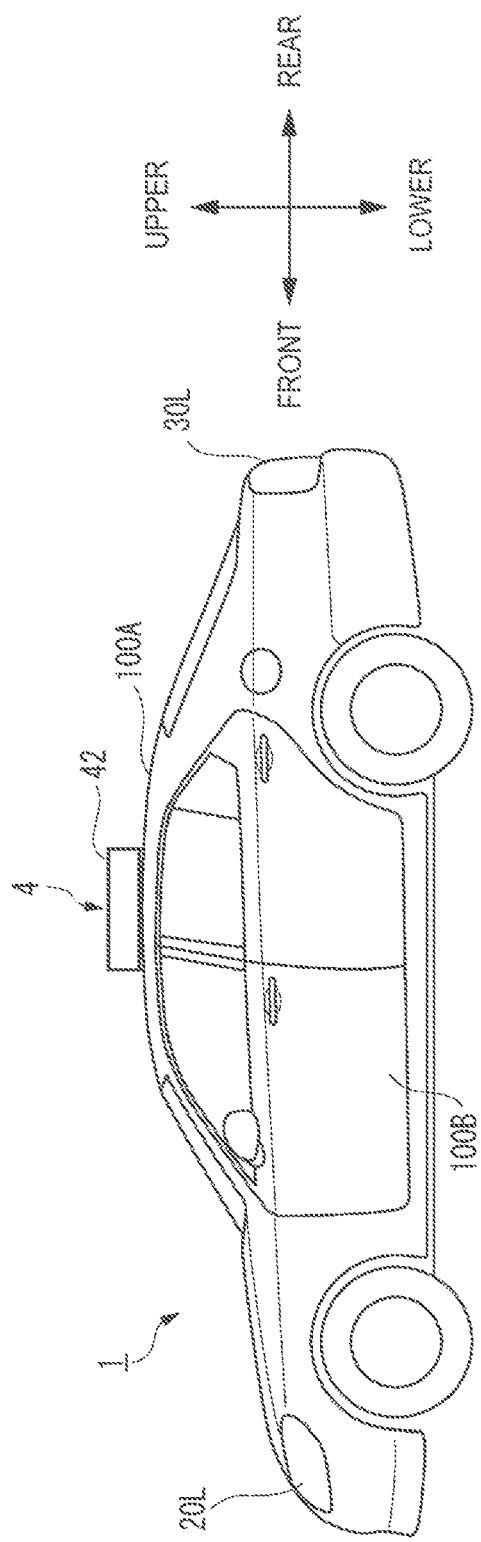
FIG. 1B is a left side view of the vehicle shown in FIG. 1A.

A vehicle illumination device 4 according to the embodiment (hereinafter, simply referred to as "illumination device 4") is described. FIG. 1A is a plan view of the vehicle 1, and FIG. 1B is a left side view of the vehicle 1. The vehicle 1 is a vehicle capable of traveling in an automatic driving mode, and includes the illumination device 4. The illumination device 4 includes an illumination unit 42, and an illumination control unit 43 (refer to FIG. 2). The illumination unit 42 is arranged on a vehicle body roof 100A of the vehicle 1, and is configured to irradiate light toward an outside of the vehicle 1. In particular, the illumination unit 42 is configured to irradiate light over an entire circumference (360°) of the illumination unit 42 in a horizontal direction. Here, the horizontal direction refers to a direction including the front and rear direction and the right and left direction.

Meanwhile, in the embodiment, the single illumination unit 42 is arranged on the vehicle body roof 100A. However, the number, arrangement, shape and the like of the illumination unit 42 are not particularly limited. For example, the two illumination units 42 of the four illumination units 42 may be respectively arranged in a left headlamp 20L and a right headlamp 20R, and the other illumination units 42 may be respectively arranged in a left rear combination lamp 30L and a right rear combination lamp 30R. Also, the illumination unit 42 may be arranged to surround a side surface 100B of the vehicle 1.

Figure 2:
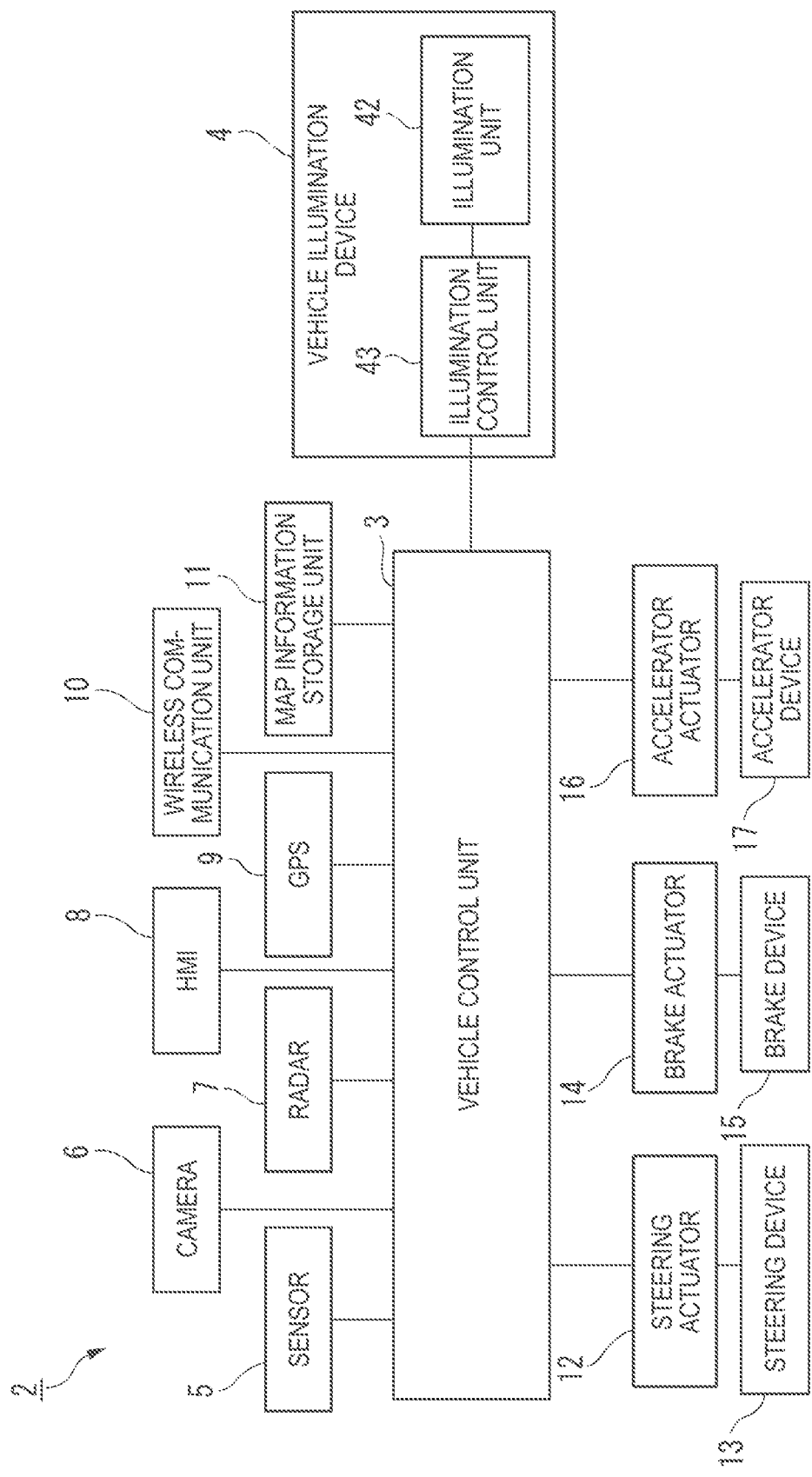
FIG. 2 is a block diagram of a vehicle system including the vehicle illumination device according to the embodiment of the present invention.

Subsequently, a vehicle system 2 of the vehicle 1 is described with reference to FIG. 2. FIG. 2 is a block diagram of the vehicle system 2. As shown in FIG. 2, the vehicle system 2 includes a vehicle control unit 3, the illumination device 4, a sensor 5, a camera 6, a radar 7, a HMI (Human Machine Interface) 8, a GPS (Global Positioning System) 9, a wireless communication unit 10 (the first wireless communication unit), and a map information storage 11. In addition, the vehicle system 2 includes a steering actuator 12, a steering device 13, a brake actuator 14, a brake device 15, an accelerator actuator 16, and an accelerator device 17.

The vehicle control unit 3 is configured to control travelling of the vehicle 1. The vehicle control unit 3 is configured by, for example, an electronic control unit (ECU). The electronic control unit includes a microcontroller having a processor and a memory, and other electronic circuits (for example, transistors, and the like). The processor is, for example, a CPU (Central Processing Unit), an MPU (Micro Processing Unit) and/or a GPU (Graphics Processing Unit). The memory includes a ROM (Read Only Memory) in which diverse vehicle control programs (for example, an artificial intelligence (AI) program for automatic driving, and the like) are stored, and a RAM (Random Access Memory) in which diverse vehicle control data is temporarily stored. The processor is configured to develop, on the RAM, a program designated from the diverse vehicle control programs stored in the ROM and to execute a variety of processes in cooperation with the RAM.

The illumination device 4 includes the illumination unit 42 and the illumination control unit 43. The illumination unit 42 includes one or more light emitting elements such as LEDs (Light Emitting Diodes) or laser and is configured to irradiate light toward the outside of the vehicle 1. The illumination control unit 43 is configured by an electronic control unit (ECU). The illumination control unit 43 is electrically connected to a power supply (not shown), and includes a microcontroller having a processor such as a CPU and a GPU and a memory such as a ROM and a RAM, and other electronic circuits (for example, a drive circuit such as an LED driver). In the embodiment, the vehicle control unit 3 and the illumination control unit 43 are provided as separate components but may be integrally configured. That is, the illumination control unit 43 and the vehicle control unit 3 may be configured by a single electronic control unit. The illumination control unit 43 is configured to control the illumination unit 42 based on an illumination control signal transmitted from a traffic infrastructure equipment 70 (refer to FIG. 3) including a light-emitting body 50 and a communication device 60, such that an illumination state of the illumination unit 42 corresponds to an illumination state of the light-emitting body 50 (more specifically, a light-emitting unit 52 of the light-emitting body 50). Here, the illumination control signal includes information indicative of a predetermined illumination state. For example, the illumination control unit 43 may be configured to control the illumination unit 42 to blink in synchronization with the light-emitting body 50. Also, the illumination control unit 43 may be configured to control the illumination unit 42 such that an illumination color of the illumination unit 42 corresponds to an illumination color of the light-emitting body 50.

The sensor 5 includes an acceleration sensor, a speed sensor, a gyro sensor, and the like. The sensor 5 is configured to detect a travelling condition of the vehicle 1 and to output travelling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging device such as a CCD (Charge-Coupled Device) and CMOS (complementary MOS). The radar 7 is a millimeter wave radar, a microwave radar, a laser radar, or the like. The camera 6 and/or the radar 7 are configured to detect surrounding environments (other vehicles, pedestrians, road shapes, traffic signs, obstacles, and the like) of the vehicle 1 and to output surrounding environment information to the vehicle control unit 3.

The HMI 8 includes an input unit configured to receive an input operation from a driver and an output unit configured to output the travelling information and the like to the driver. The input unit includes a steering wheel, an accelerator pedal, a brake pedal, a driving mode changeover switch for switching the driving mode of the vehicle 1, and the like. The output unit is a display for displaying diverse travelling information.

Figure 3:
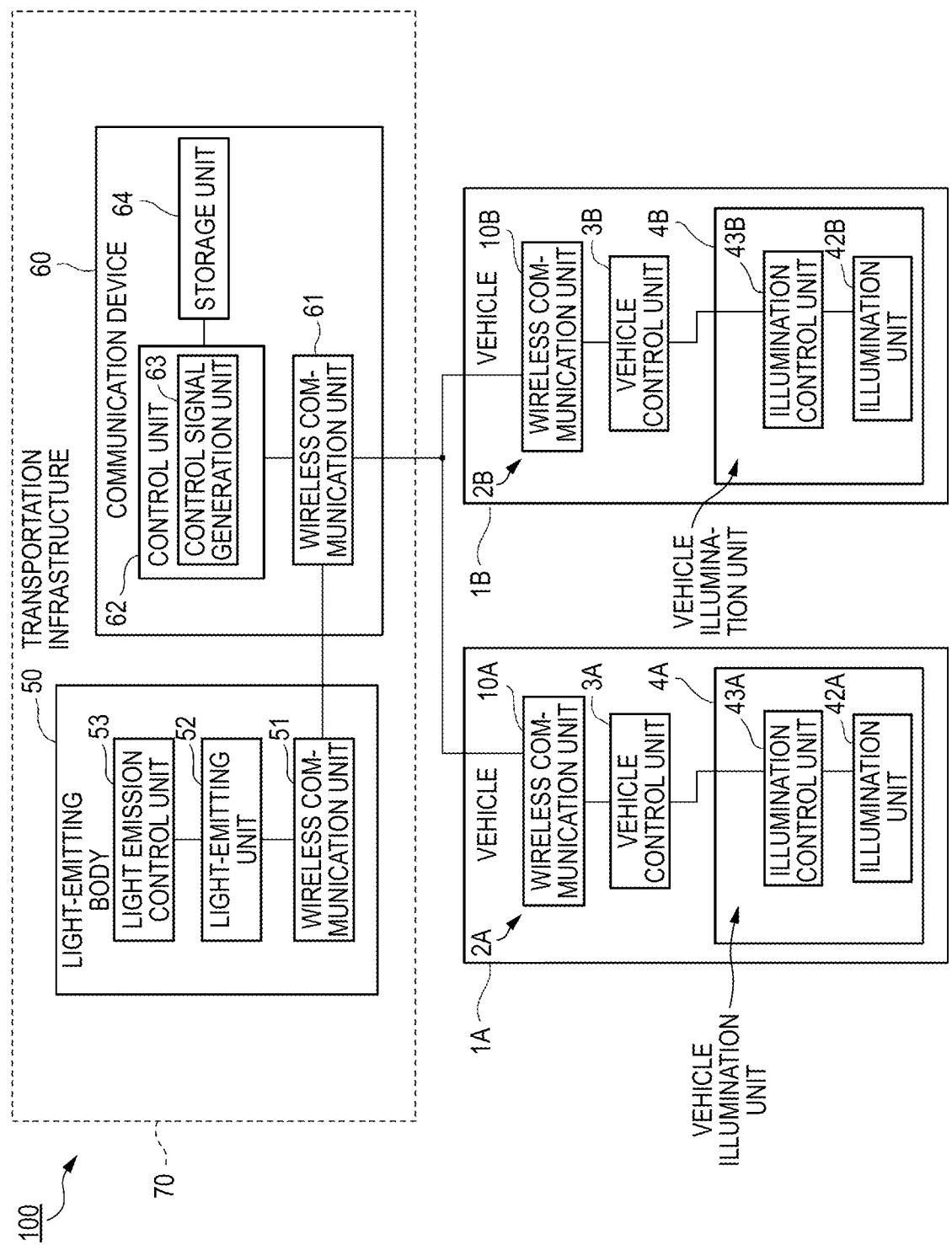
FIG. 3 depicts a configuration of an illumination control system according to the embodiment of the present invention.

The GPS 9 is configured to acquire current position information of the vehicle 1 and to output the acquired current position information to the vehicle control unit 3. The wireless communication unit 10 (the first wireless communication unit) is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, as shown in FIG. 3, the wireless communication unit 10 (10A, 10B) is configured to receive an illumination control signal from the communication device 60 of the traffic infrastructure equipment 70. Also, the wireless communication unit 10 is configured to receive infrastructure information from the communication device 60 and to transmit the traveling information of the vehicle 1 to the communication device 60 (road-to-vehicle communication). The vehicle 1 may be configured to perform communication with the other vehicle and the traffic infrastructure equipment directly or via an access point. The map information storage 11 is an external storage device such as a hard disk drive in which map information is stored, and is configured to output the map information to the vehicle control unit 3.

When the vehicle 1 travels in an automatic driving mode, the vehicle control unit 3 automatically generates at least one of a steering control signal, an accelerator control signal and a brake control signal, based on the travelling condition information, the surrounding environment information, the current position information, the map information, and the like. The steering actuator 12 is configured to receive the steering control signal from the vehicle control unit 3 and to control the steering device 13 based on the received steering control signal. The brake actuator 14 is configured to receive the brake control signal from the vehicle control unit 3 and to control the brake device 15 based on the received brake control signal. The accelerator actuator 16 is configured to receive the accelerator control signal from the vehicle control unit 3 and to control the accelerator device 17 based on the received accelerator control signal. In this way, in the automatic driving mode, the travelling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a manual operation of a driver on the accelerator pedal, the brake pedal and the steering wheel. In this way, in the manual driving mode, the steering control signal, the accelerator control signal and the brake control signal are generated by the manual operation of the driver, so that the travelling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the travelling controls of the steering control, the brake control and the accelerator control, and the driver is not in a state where it is possible to drive the vehicle 1. In the advanced driving support mode, the vehicle system 2 is configured to automatically perform all of the travelling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the travelling controls of the steering control, the brake control and the accelerator control, and the driver drives the vehicle 1 under the driving support of the vehicle system 2. On the other hand, in the manual driving mode, the vehicle system 2 is configured not to automatically perform the travelling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in accordance with a driver's operation on the driving mode changeover switch. Also, the driving mode of the vehicle 1 may be automatically switched based on information relating to a travel-allowed section where travelling of an automatic driving vehicle is allowed or a travel-prohibited section where the travelling of the automatic driving vehicle is prohibited or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

<Illumination Control System 100>

Subsequently, an illumination control system 100 is described with reference to FIG. 3. FIG. 3 depicts a configuration of the illumination control system 100 according to the embodiment. As shown in FIG. 3, the illumination control system 100 includes vehicles 1A, 1B and the traffic infrastructure equipment 70. The vehicles 1A, 1B include vehicle systems 2A, 2B having the same configuration as the vehicle system 2 shown in FIG. 2, respectively. Also, for the sake of convenience of description, in the vehicles 1A, 1B of FIG. 3, only some constitutional elements are shown (for example, it should be noted that the configurations of the camera, the sensor, the radar and the like are omitted). Wireless communication units 10A, 10B have the same configuration as the wireless communication unit 10 shown in FIG. 2, vehicle control units 3A, 3B have the same configuration as the vehicle control unit 3 shown in FIG. 2, and vehicle illumination devices 4A, 4B (hereinafter, simply referred to as the illumination devices 4A, 4B) have the same configuration as the illumination device 4 shown in FIG. 2. Also, illumination control units 43A, 43B have the same configuration as the illumination control unit 43 shown in FIG. 2, and illumination units 42A, 42B have the same configuration as the illumination unit 42 shown in FIG. 2. Meanwhile, in the illumination control system 100 shown in FIG. 3, the two vehicles 1A, 1B are shown. However, the number of the vehicles is not particularly limited.

The traffic infrastructure equipment 70 includes the light-emitting body 50 and the communication device 60. The light-emitting body 50 includes a wireless communication unit 51 (the third wireless communication unit), a light-emitting unit 52, and a light emission control unit 53. The wireless communication unit 51 is configured to perform wireless communication with the communication device 60, and is particularly configured to receive an illumination control signal from the communication device 60. The light-emitting unit 52 includes one or more light-emitting elements such as LEDs, laser or the like, and is configured to irradiate light toward an outside. In particular, the light-emitting unit 52 is configured to irradiate light over an entire circumference (360°) of the light-emitting unit 52 in the horizontal direction. The light emission control unit 53 is configured by an electronic control unit (ECU), and is configured to control an illumination state of the light-emitting unit 52, particularly, to control the light-emitting unit 52 such that an illumination state of the light-emitting unit 52 corresponds to illumination states of the illumination units 42A, 42B, based on the received illumination control signal. For example, the light emission control unit 53 may be configured to control the light-emitting unit 52 to blink in synchronization with the illumination units 42A, 42B. Also, the light emission control unit 53 may be configured to control the light-emitting unit 52 such that an illumination color of the light-emitting unit 52 corresponds to illumination colors of the illumination units 42A, 42B.

The communication device 60 includes a wireless communication unit 61 (the second wireless communication unit), a control unit 62, and a storage 64. The wireless communication unit 61 is configured to perform wireless communication with the light-emitting body 50 and the vehicles 1A, 1B, and is particularly configured to transmit the illumination control signal. The control unit 62 is configured by an electronic control unit (ECU), and is configured to control respective operations of the communication device 60. The control unit 62 includes a control signal generation unit 63 configured to generate an illumination control signal indicative of a predetermined illumination state. The storage 64 is configured to store therein map information and the like, and is configured by an HDD (Hard Disk Drive), an SSD (Solid State Drive), and the like, for example. The map information may be acquired through a communication network such as Internet. In the meantime, the light-emitting body 50 and the communication device 60 may be configured individually or integrally. When the light-emitting body 50 and the communication device 60 are integrally configured, the wireless communication unit 51 may not be provided to the light-emitting body 50.

<Operations of Illumination Control System 100 at Intersection Point>

Figure 4:
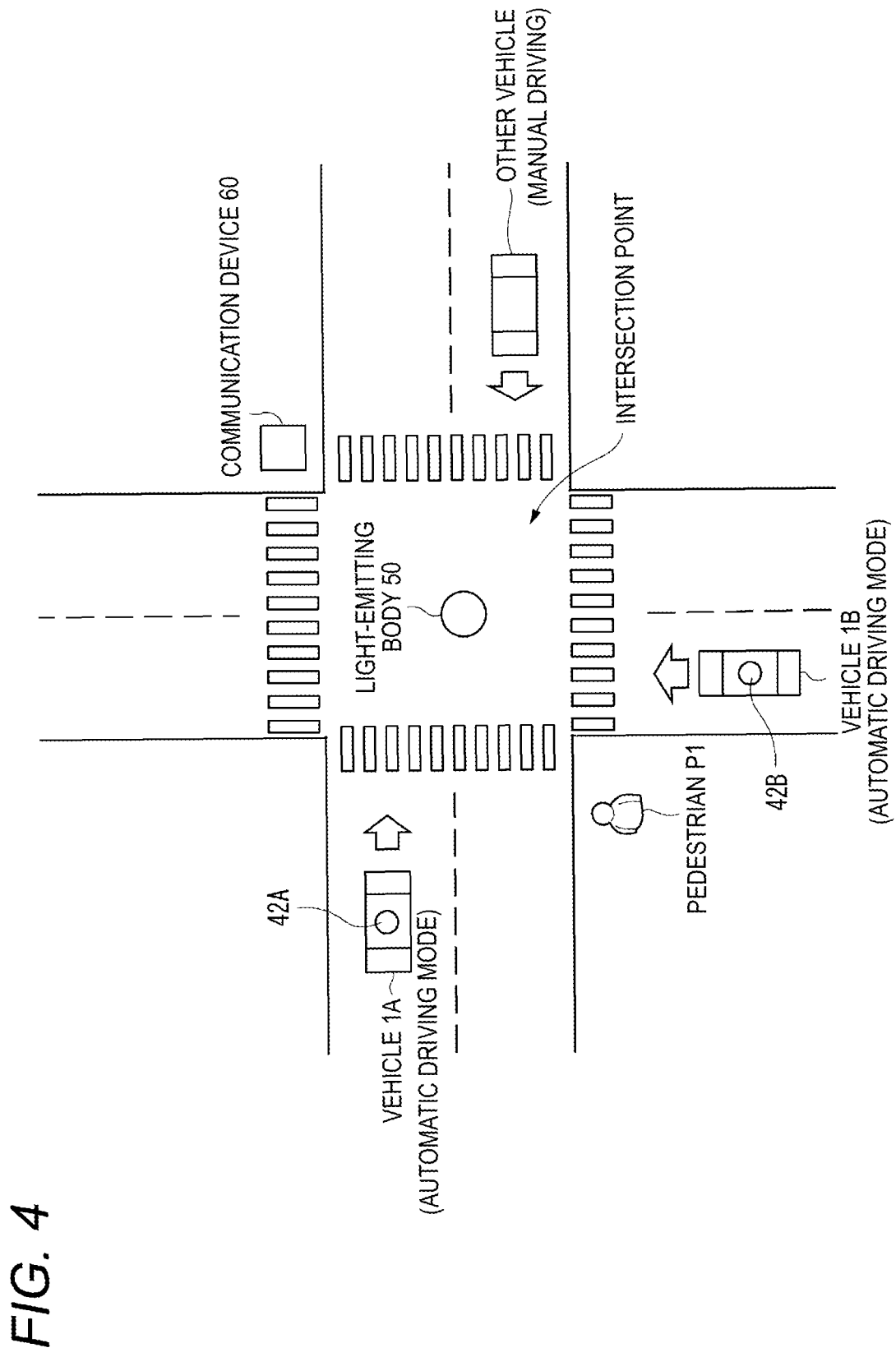
FIG. 4 illustrates a situation where illumination states of illumination units of vehicles and an illumination state of a light-emitting body correspond to each other at an intersection point.

Subsequently, operations of the illumination control system 100 at an intersection point are described with reference to FIGS. 3 to 6. FIG. 4 illustrates a situation where illumination states of the illumination units 42A, 42B of the vehicles 1A, 1B and an illumination state of the light-emitting unit 52 of the light-emitting body 50 correspond to each other at an intersection point. As shown in FIG. 4, the light-emitting body 50 is arranged at a predetermined position (for example, a position close to a center) on a road surface of the intersection point, and the communication device 60 is arranged in the vicinity of the intersection point (for example, in the vicinity of a traffic light (not shown)). In the meantime, the light-emitting body 50 may be arranged above the road surface of the intersection point or in the vicinity of the intersection point. For example, the light-emitting body 50 may be attached to a traffic light or a streetlight arranged in the vicinity of the intersection point. When the vehicles 1A, 1B exist within a predetermined range from the communication device 60, the wireless communication units 10A, 10B can receive the illumination control signal, the surrounding information of the intersection point and the like from the wireless communication unit 61. Likewise, when the light-emitting body 50 exists within the predetermined range from the communication device 60, the wireless communication unit 51 can receive a wireless signal such as the illumination control signal from the wireless communication unit 61.

Figure 5:
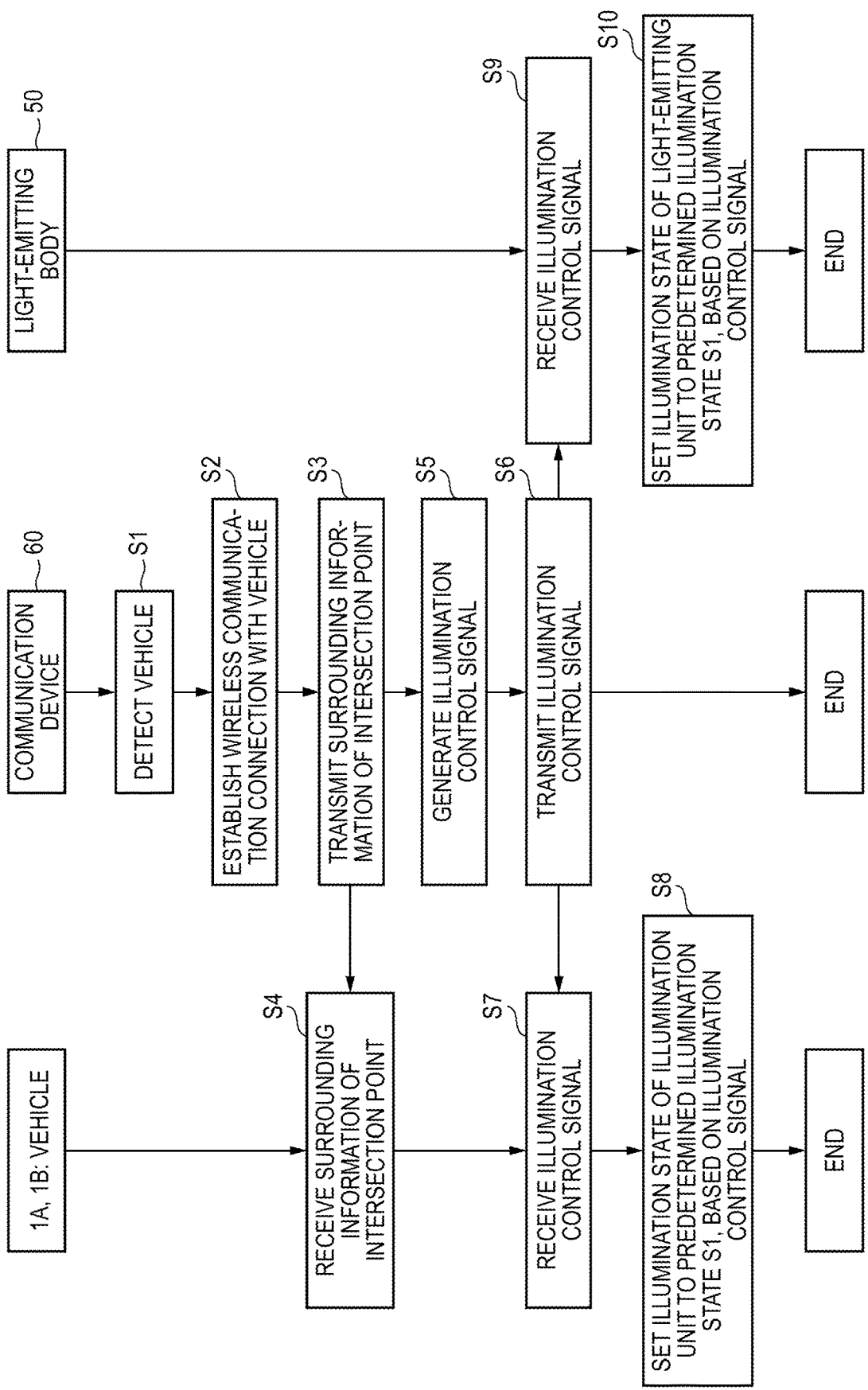
FIG. 5 is a sequence diagram for illustrating an example of an operation of the illumination control system.

Subsequently, an example of the operation of the illumination control system 100 is described with reference to FIG. 5. FIG. 5 is a sequence diagram for illustrating an example of the operation of the illumination control system 100. Meanwhile, in the below, since the operation of the vehicle 1B is the same as the operation of the vehicle 1A, the operations of the vehicle 1A, the light-emitting body 50 and the communication device 60 are mainly described. As shown in FIG. 5, the communication device 60 first detects the vehicle 1A (step S1). The communication device 60 may detect the vehicle 1A by a camera or a sensor, which are not shown, or may detect the vehicle 1A by broadcasting a beacon with a predetermined period and receiving a response signal to the broadcast beacon from the vehicle 1A. In the meantime, when the vehicle 1A exists within the predetermined range from the communication device 60, the vehicle 1A can receive the beacon broadcast from the communication device 60.

Then, in step S2, the communication device 60 establishes wireless communication connection with the vehicle 1A. For example, wireless communication connection is established between the communication device 60 and the vehicle 1A by a passive scan method or an active scan method. In the case of the active scan method, the wireless communication unit 61 transmits the beacon including information relating to the wireless communication connection to the vehicle 1A with a predetermined period, in accordance with a command of the control unit 62. The vehicle control unit 3A receives the beacon transmitted from the communication device 60, via the wireless communication unit 10A. Thereafter, the communication device 60 establishes wireless communication connection with the vehicle 1A, through authentication/association between the vehicle 1A and the communication device 60. Also, in step S2, wireless communication connection may be established between the communication device 60 and the light-emitting body 50.

Then, in step S3, the communication device 60 transmits, to the vehicle 1A, the surrounding information of the intersection point (for example, the map information in the vicinity of the intersection point and information indicating whether there is a pedestrian in the vicinity of the intersection point). In particular, the wireless communication unit 61 transmits the surrounding information of the intersection point stored in the storage 64 to the vehicle 1A, in accordance with a command of the control unit 62. Then, the wireless communication unit 10A of the vehicle 1A receives the surrounding information of the intersection point from the wireless communication unit 61. In the case of the vehicle 1A traveling in the automatic driving mode, the vehicle control unit 3A automatically controls the traveling of the vehicle 1A, based on the surrounding environment information and the like acquired by the vehicle system 2A and the surrounding information of the intersection point acquired from the communication device 60. The vehicle 1A acquires the surrounding information of the intersection point from the communication device 60, so that it is possible to execute the more correct automatic driving control of the vehicle 1A.

Then, the control signal generation unit 63 generates an illumination control signal indicative of a predetermined illumination state S1 (step S5). Then, the wireless communication unit 61 transmits the generated illumination control signal to the vehicle 1A and the light-emitting body 50, in accordance with a command of the control unit 62 (step S6). The wireless communication unit 10A of the vehicle 1A receives the illumination control signal from the communication device 60 (step S7). Then, the illumination control unit 43A sets the illumination state of the illumination unit 42A to the predetermined illumination state S1, based on the received illumination control signal (step S8). Here, the predetermined illumination state S1 indicates a state in which the light is blinked at predetermined timing and with a predetermined period or a predetermined illumination color.

In the meantime, the wireless communication unit 51 of the light-emitting body 50 receives the illumination control signal from the communication device 60 (step S9). Then, the light emission control unit 53 sets the illumination state of the light-emitting unit 52 to the predetermined illumination state S1, which is the same as the illumination unit 42A, based on the received illumination control signal (step S10). Here, since the illumination state of the illumination unit 42A and the illumination state of the light-emitting unit 52 are all set to the predetermined illumination state S1, the illumination state of the illumination unit 42A and the illumination state of the light-emitting unit 52 correspond to each other. In this way, the illumination control unit 43A controls the illumination unit 42A such that the illumination state of the illumination unit 42A corresponds to the illumination state of the light-emitting unit 52, based on the illumination control signal. In the meantime, the light emission control unit 53 controls the light-emitting unit 52 such that the illumination state of the light-emitting unit 52 corresponds to the illumination state of the illumination unit 42A, based on the illumination control signal. In the above, only the illumination unit 42A of the vehicle 1A has been described. However, the illumination state of the illumination unit 42B of the vehicle 1B is also set to the predetermined illumination state S1 by the similar method. In this way, the series of processing is executed.

Meanwhile, in step S3, as an example, the communication device 60 transmits the surrounding information of the intersection point to the vehicle 1A. However, instead of this configuration, the communication device 60 may be configured to transmit, to the vehicle 1A, information (switching time of a signal, and the like) acquired from a signal device connected by the communication network. Also, the communication device 60 may be configured to transmit, to the vehicle 1A, information relating to an attribute (a person, a bicycle, a vehicle and the like) and a direction of an object existing around the vehicle 1A. In this case, the vehicle control unit 3A of the vehicle 1A is configured to automatically control the traveling of the vehicle 1A by referring to the received information.

Also, in step S3, the control signal generation unit 63 may generate a traveling control signal for controlling the traveling of the vehicle 1A, and the wireless communication unit 61 may transmit the generated traveling control signal to the vehicle 1A. In this case, the vehicle control unit 3A executes the automatic traveling control at the intersection point, based on the received traveling control signal. Like this, when the communication device 60 transmits the traveling control signal to the vehicles 1A, 1B, the traveling of the vehicles 1A, 1B may be controlled by the communication device 60.

In the meantime, the communication device 60 may establish wireless communication connection with an electronic device (for example, a portable phone, a smart phone, a tablet, a wearable device and the like) carried by a pedestrian in the vicinity of the intersection point. In this case, the communication device 60 (the wireless communication unit 61) may establish wireless communication connection with the electronic device carried by the pedestrian (hereinafter, simply referred to as the electronic device) and then transmit the illumination control signal indicative of predetermined illumination state S1 to the electronic device. A control unit of the electronic device may control a display unit (or a light-emitting unit) of the electronic device such that an illumination state of the display unit (or the light-emitting unit) of the electronic device is the predetermined illumination state S1, in correspondence to the received illumination control signal. In this way, the illumination state of the light-emitting unit 52, the illumination state of the illumination unit 42A and the illumination state of the display unit (or the light-emitting unit) of the electronic device may be associated with one another.

Figure 6:
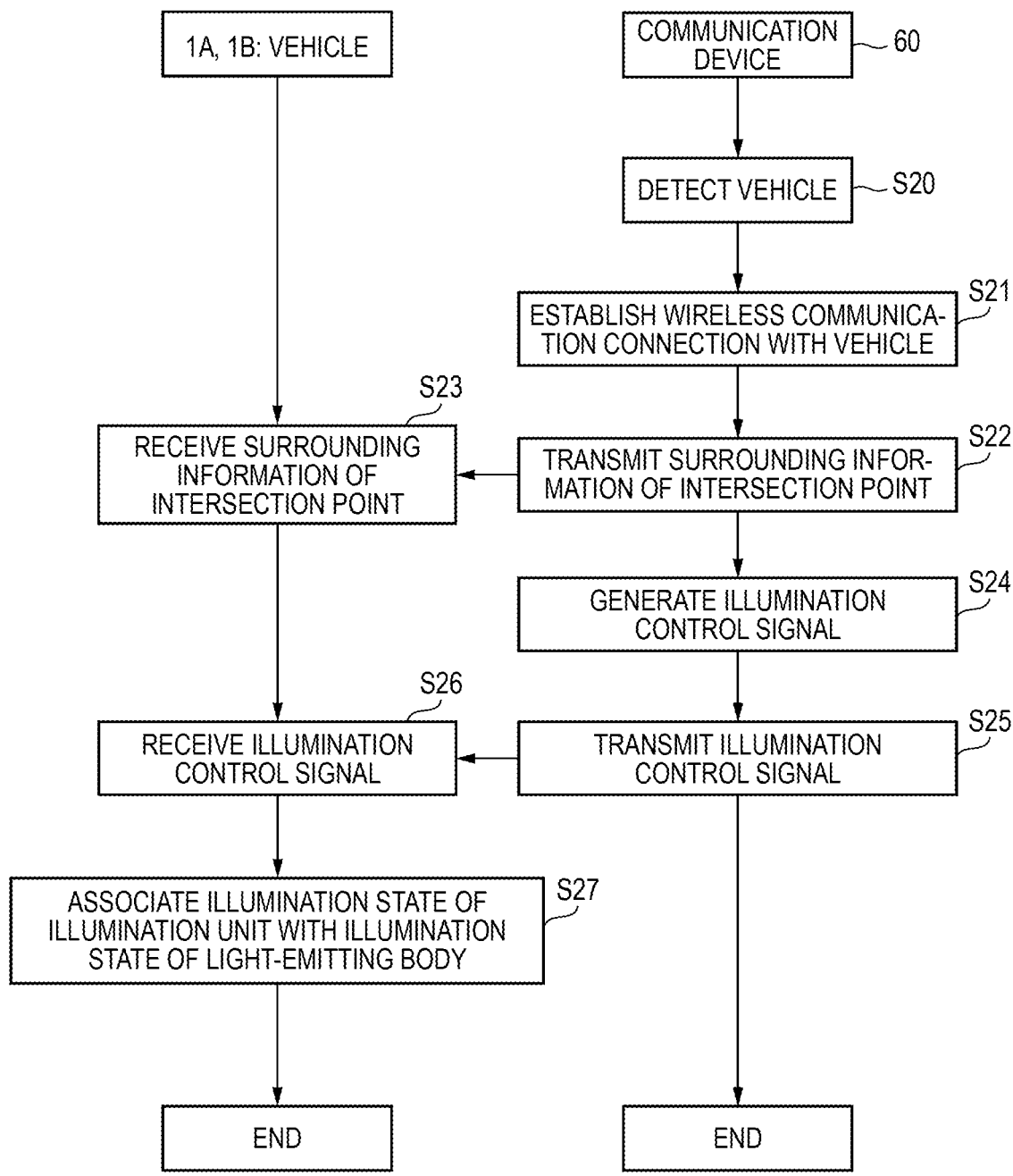
FIG. 6 is a sequence diagram for illustrating another example of the operation of the illumination control system.

Subsequently, another example of the operation of the illumination control system 100 is described with reference to FIG. 6. FIG. 6 is a sequence diagram for illustrating another example of the operation of the illumination control system 100. Meanwhile, like the above example, in the below, since the operation of the vehicle 1B is the same as the operation of the vehicle 1A, the operations of the vehicle 1A and the communication device 60 are mainly described. The operation of the illumination control system 100 shown in FIG. 6 is different from the operation of the illumination control system 100 shown in FIG. 5, in that the illumination state of the light-emitting unit 52 of the light-emitting body 50 is not controlled by the illumination control signal transmitted from the communication device 60. Hereinafter, the operations are described.

First, the communication device 60 detects the vehicle 1A (step S20). The communication device 60 detects the vehicle 1A by a method similar to step S1 shown in FIG. 5. Then, in step S21, the communication device 60 establishes wireless communication connection with the vehicle 1A. The communication device 60 establishes wireless communication connection with the vehicle 1A by a method similar to step S2 shown in FIG. 5. Then, in step S22, the wireless communication unit 61 transmits the surrounding information of the intersection point to the vehicle 1A, in accordance with a command of the control unit 62. Thereafter, the wireless communication unit 10A of the vehicle 1A receives the surrounding information of the intersection point from the wireless communication unit 61 (step S23).

Then, in step S24, the control signal generation unit 63 generates an illumination control signal indicative of the illumination state of the light-emitting unit 52. Here, when the information relating to the illumination state of the light-emitting unit 52 is stored in the storage 64, the control signal generation unit 63 may generate the illumination control signal indicative of the illumination state of the light-emitting unit 52, based on the information relating to the illumination state of the light-emitting unit 52. Also, the wireless communication unit 61 may receive the information relating to the illumination state of the light-emitting unit 52 from the wireless communication unit 51. Then, the wireless communication unit 61 transmits the generated illumination control signal to the vehicle 1A, in accordance with a command of the control unit 62 (step S25). The wireless communication unit 10A of the vehicle 1A receives the illumination control signal from the communication device 60 (step S26). Then, the illumination control unit 43A controls the illumination unit 42A such that the illumination state of the illumination unit 42A corresponds to the illumination state of the light-emitting unit 52 of the light-emitting body 50, based on the received illumination control signal (step S27). Similarly, the illumination unit 42B is controlled such that the illumination state of the illumination unit 42B of the vehicle 1B corresponds to the illumination state of the light-emitting unit 52. In this way, the series of processing is executed.

According to the embodiment, it is possible to provide the illumination device 4 capable of presenting the information, which indicates that the vehicles 1A, 1B capable of traveling in the automatic driving mode are performing communication with the traffic infrastructure equipment 70, toward an outside such as the other vehicle traveling in the manual driving mode, a pedestrian P1, and the like. In other words, it is possible to visualize a state of road-to-vehicle communication between the vehicles 1A, 1B and the traffic infrastructure equipment 70 by the illumination device 4. For example, since the pedestrian P1 and the like can check safety of the vehicles 1A, 1B by seeing the information indicating that the vehicles 1A, 1B are performing communication with traffic infrastructure equipment 70, the pedestrian can cross in relief a crosswalk and the like. Also, since a driver of the other vehicle can check safety of the vehicles 1A, 1B by seeing the information indicating that the vehicles 1A, 1B are performing communication with the traffic infrastructure equipment 70, the driver can pass in relief the intersection point.

Also, since the illumination control units 43A, 43B control the illumination units 42A, 42B to blink in synchronization with the light-emitting body 50, the pedestrian P1 and the like can perceive that the vehicles 1A, 1B are performing communication with the traffic infrastructure equipment 70 by seeing the situation where the illumination units 42A, 42B are blinking in synchronization with the light-emitting body 50.

Also, since the illumination control units 43A, 43B control the illumination units 42A, 42B such that the illumination colors of the illumination units 42A, 42B are to correspond to the illumination color of the light-emitting body 50, the pedestrian P1 and the like can perceive that the vehicles 1A, 1B are performing communication with the traffic infrastructure equipment 70 by seeing the situation where the illumination colors of the illumination units 42A 42B correspond to the illumination color of the light-emitting body 50.

Also, according to the example of the operation of the illumination control system 100, which is shown in FIG. 5, at the traffic infrastructure equipment 70-side, the light-emitting unit 52 is controlled such that the illumination state of the light-emitting unit 52 corresponds to the illumination states of the illumination units 42A, 42B, and at the vehicles 1A, 1B-side, the illumination units 42A, 42B are controlled such that the illumination state of the illumination unit 52 corresponds to the illumination states of the illumination units 42A, 42B, based on the illumination control signal transmitted from the communication device 60. Thus, the pedestrian P1 and the like can more easily perceive an aspect where the illumination state of the traffic infrastructure equipment 70 and the illumination states of the vehicles 1A, 1B correspond to each other.

Also, when the vehicles 1A, 1B exist within the predetermined range from the communication device 60, the wireless communication units 10A, 10B can receive the illumination control signal from the wireless communication unit 61. Therefore, the vehicles 1A, 1B existing within the predetermined range from the traffic infrastructure equipment 70 (the communication device 60) can present the information, which indicates that the vehicles 1A, 1B are performing communication with the traffic infrastructure equipment 70, toward the outside such as the other vehicle, the pedestrian P1 and the like. Accordingly, the pedestrian P1 and the like in the vicinity of the traffic infrastructure equipment 70 can check the safety of the vehicles 1A. 1B by seeing the information.

Also, since the light-emitting body 50 is arranged at the predetermined position on the intersection point and the communication device 60 is arranged in the vicinity of the intersection point, the vehicles 1A, 1B existing within the predetermined range from the intersection point can present the information, which indicates that the vehicles 1A, 1B are performing communication with the traffic infrastructure equipment 70, toward the outside such as the other vehicle, the pedestrian and the like. Accordingly, the pedestrian P1 in the vicinity of the intersection point can check the safety of the vehicles 1A, 1B by seeing the information and can cross in relief the crosswalk.

Also, when the illumination state of the light-emitting unit 52, the illumination states of the illumination units 42A, 42B and the illumination state of the display unit (or the light-emitting unit) of the electronic device carried by the pedestrian P1 in the vicinity of the intersection point are associated, the pedestrian P1 can visually recognize that the vehicles 1A, 1B, the traffic infrastructure equipment 70 and the electronic device are performing communication with each other, and can check the safety in the vicinity of the intersection point.

<Operations of Illumination Control System 100 on Straight Road>

Figure 7:
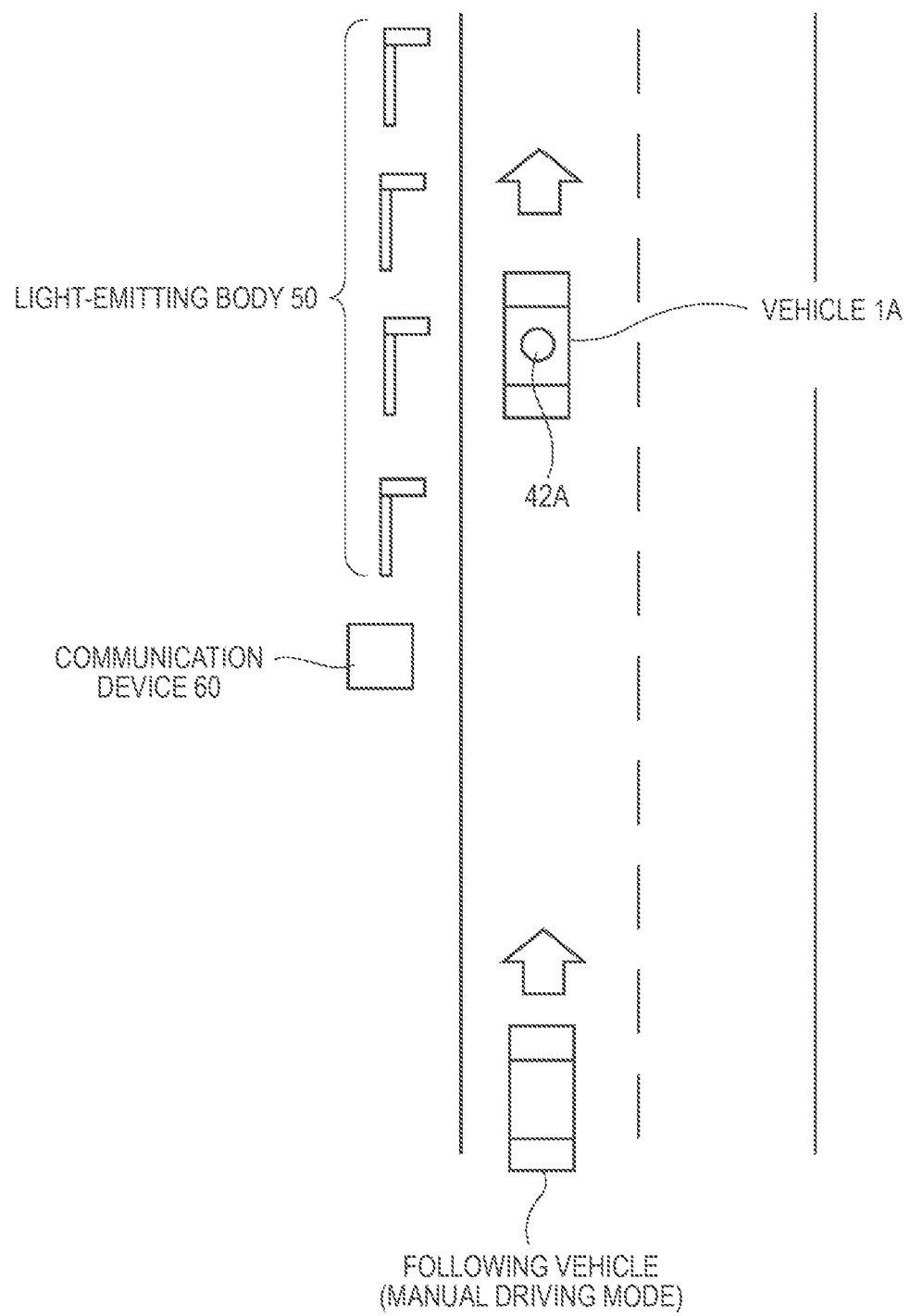
FIG. 7 illustrates a situation where illumination states of a plurality of light-emitting bodies arranged side by side at an outer side of a road and an illumination state of the illumination unit of the vehicle correspond to each other.

Subsequently, an example of the operation of the illumination control system 100 on a straight road is described with reference to FIGS. 3 and 5 to 7. FIG. 7 illustrates a situation where illumination states of the light-emitting units 52 of a plurality of light-emitting bodies 50 arranged side by side at an outer side of a road and an illumination state of the illumination unit 42A of the vehicle 1A correspond to each other. The traffic infrastructure equipment 70 includes the communication device 60 and the plurality of light-emitting bodies 50.

In this example, when the vehicle 1A comes close to the communication device 60 (in other words, when the vehicle 1A exists within a predetermined range from the communication device 60), the communication device 60 detects the vehicle 1A by a method similar to step S1 shown in FIG. 5, and the communication device 60 establishes wireless communication connection with the vehicle 1A by a method similar to step S2 shown in FIG. 5. Then, the communication device 60 transmits the surrounding information of the communication device 60 (for example, the detailed map information around the communication device 60, and the like) to the vehicle 1A, and the vehicle 1A receives the transmitted information.

Then, the communication device 60 generates an illumination control signal by a method similar to step S5 shown in FIG. 5, and transmits the illumination control signal to the vehicle 1A and each of the plurality of light-emitting bodies 50 by a method similar to step S6 shown in FIG. 5. Then, the illumination control unit 43A of the vehicle 1A sets the illumination state of the illumination unit 42A to the predetermined illumination state S1, based on the received illumination control signal. In the meantime, the light emission control unit 53 of each of the plurality of light-emitting bodies 50 sets the illumination state of the light-emitting unit 52 to the predetermined illumination state S1 based on the received illumination control signal. In this way, the illumination control unit 43A controls the illumination unit 42A such that the illumination state of the illumination unit 42A corresponds to the illumination states of the light-emitting units 52 of the plurality of light-emitting bodies 50, based on the illumination control signal. Meanwhile, in this example, like the operation example of the illumination control system shown in FIG. 6, the illumination control unit 43A may control the illumination unit 42A such that the illumination state of the illumination unit 42A corresponds to the illumination state of each light-emitting unit 52.

According to the embodiment, since the driver of the following vehicle traveling in the manual driving mode behind the vehicle 1A can check the safety of the vehicle 1A by seeing the information, which indicates that the vehicle 1A is performing communication with the traffic infrastructure equipment 70 (the plurality of light-emitting bodies 50), the driver can overtake in relief the vehicle 1A.

<Illumination Control System 100 Including Group of Vehicles G Traveling in Row Traveling Mode and Traffic Infrastructure Equipment 70>

Figure 8:
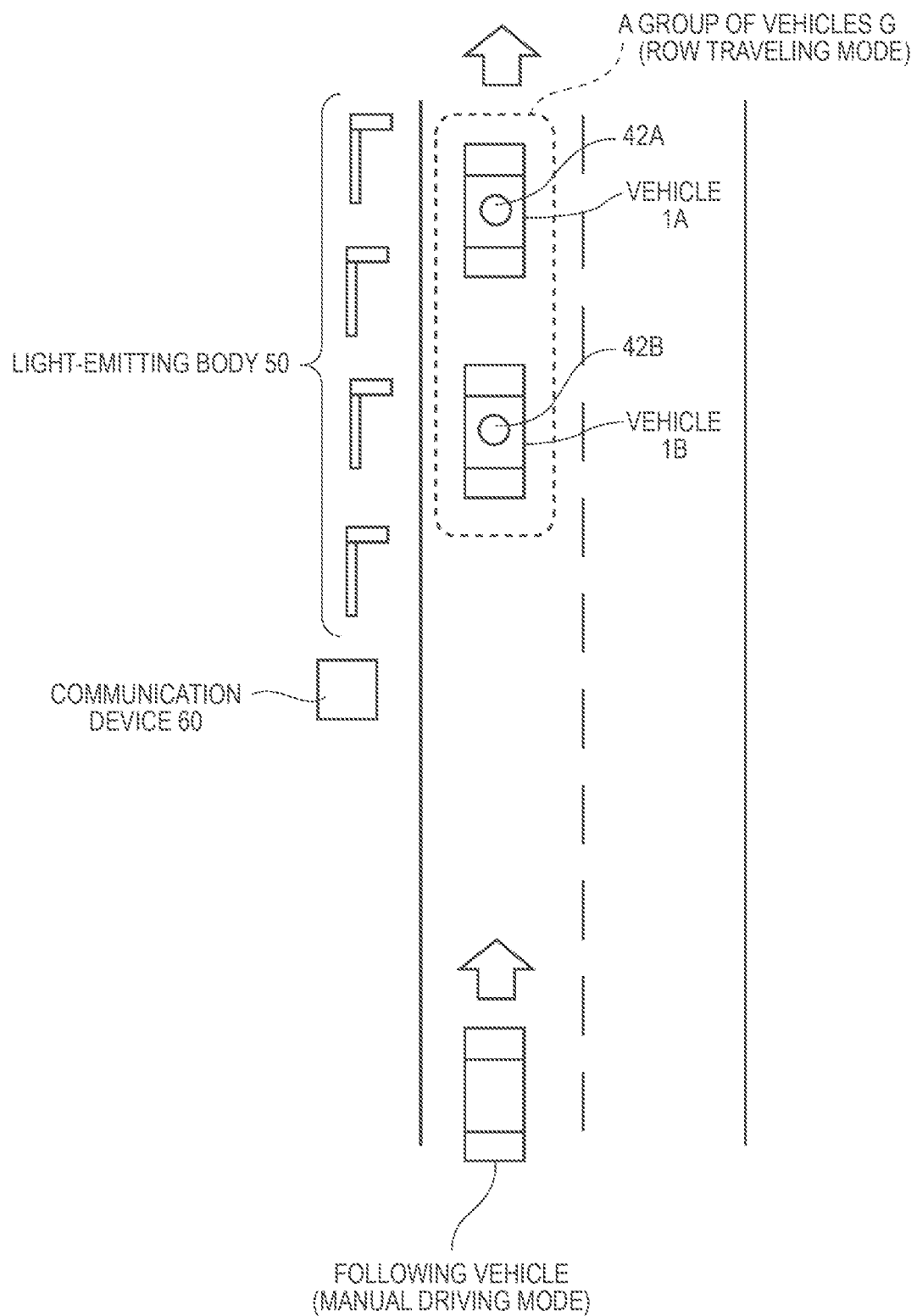
FIG. 8 illustrates a situation where illumination states of a plurality of light-emitting bodies arranged side by side at an outer side of a road and illumination states of the illumination units of a group of vehicles traveling in a row traveling mode correspond to each other.

Subsequently, the illumination control system 100 including a group of vehicles G traveling in a row traveling mode and the traffic infrastructure equipment 70 is described with reference to FIGS. 3, 5, 6 and 8. FIG. 8 illustrates a situation where the illumination states of the light-emitting units 52 of the plurality of light-emitting bodies 50 arranged side by side at an outer side of a road and illumination states of the illumination units 42A, 42B of a group of vehicles G traveling in a row traveling mode correspond to each other. The traffic infrastructure equipment 70 includes the communication device 60, and the plurality of light-emitting bodies 50.

Here, in the row traveling mode, a following vehicle executes the automatic traveling control, based on a row traveling control signal transmitted from a leading vehicle. In the meantime, the following vehicle may be configured to execute the automatic traveling control, based on only the row traveling control signal transmitted from the leading vehicle or may be configured to execute the automatic traveling control, based on the transmitted row traveling control signal, the surrounding environment information acquired by a camera and a radar of the following vehicle, and the like. As shown in FIG. 8, the vehicle 1A is a leading vehicle of a group of vehicles G, and the vehicle 1B is a following vehicle of the group of vehicles G. The vehicle 1A may travel in the automatic driving mode or in the manual driving mode. In the meantime, the number of vehicles belonging to the group of vehicles G may be three or more.

As shown in FIG. 3, the vehicle control unit 3A of the vehicle 1A, which is the leading vehicle, generates a row traveling control signal. Then, the wireless communication unit 10A transmits the generated row traveling control signal to the vehicle 1B, in accordance with a command of the vehicle control unit 3A. The wireless communication unit 10B of the vehicle 1B, which is the following vehicle, receives the row traveling control signal, and then the vehicle control unit 3B automatically controls the traveling of the vehicle 1B, based on the row traveling control signal. Here, the vehicle 1A and the vehicle 1B directly perform communication with each other in an ad hook mode.

Subsequently, the operations of the illumination control system 100 of this example are described. In the below, since the operations of the vehicle 1A are the same as the operations of the vehicle 1B, the operations of the vehicle 1A, the communication device 60 and the plurality of light-emitting bodies 50 are mainly described.

First, when the vehicle 1A comes close to the communication device 60 (in other words, when the vehicle 1A exists within the predetermined range from the communication device 60), the communication device 60 detects the vehicle 1A by a method similar to step S1 shown in FIG. 5, and the communication device 60 establishes wireless communication connection with the vehicle 1A by a method similar to step S2 shown in FIG. 5. Then, the communication device 60 transmits the surrounding information of the communication device (for example, the near detailed map information) to the vehicle 1A, and the vehicle 1A receives the transmitted information.

Then, the communication device 60 generates an illumination control signal by a method similar to step S5 shown in FIG. 5, and transmits the illumination control signal to the vehicle 1A and each of the plurality of light-emitting bodies 50 by a method similar to step S6 shown in FIG. 5. Then, the illumination control unit 43A of the vehicle 1A sets the illumination state of the illumination unit 42A to the predetermined illumination state S1, based on the received illumination control signal. In the meantime, the light emission control unit 53 of each of the plurality of light-emitting bodies 50 sets the illumination state of the light-emitting unit 52 to the predetermined illumination state S1, based on the received illumination control signal. In this way, the illumination control unit 43A controls the illumination unit 42A such that the illumination state of the illumination unit 42A corresponds to the illumination states of the light-emitting units 52 of the plurality of light-emitting bodies 50, based on the illumination control signal. Meanwhile, in this example, like the operations of the illumination control system shown in FIG. 6, the illumination control unit 43A may control the illumination unit 42A such that the illumination state of the illumination unit 42A corresponds to the illumination state of each light-emitting unit 52.

Similarly, the illumination control unit 43B of the vehicle 1B sets the illumination state of the illumination unit 42B to the predetermined illumination state S1, based on the received illumination control signal. Also, as shown in FIG. 6, the vehicle control unit 3B may control the illumination unit 42B such that the illumination state of the illumination unit 42B corresponds to the illumination state of each light-emitting unit 52. In the meantime, the vehicle 1B may be configured to directly receive the illumination control signal from the communication device 60 or to receive the illumination control signal via the vehicle 1A. In this case, the wireless communication unit 10B receives the illumination control signal from the wireless communication unit 10A.

According to the embodiment, it is possible to provide the illumination control system 100 capable of presenting the information, which indicates that the group of vehicles G traveling in the row traveling mode is performing communication with the traffic infrastructure equipment 70, toward an outside such as other vehicle, a pedestrian and the like. For example, since a driver of the following vehicle traveling in the manual driving mode behind the group of vehicles G can check the safety of the group of vehicles G by seeing the information, which indicates that the group of vehicles G is performing communication with the traffic infrastructure equipment 70 (the plurality of light-emitting bodies 50), the driver can overtake in relief the group of vehicles G.

Also, the illumination control unit 43A of the vehicle 1A may control the illumination unit 42A and the illumination control unit 43B of the vehicle 1B may control the illumination unit 42B such that an illumination pattern formed by the group of vehicles G corresponds to an illumination pattern formed by the plurality of light-emitting bodies 50. For example, a blinking pattern that is formed by the illumination units 42A, 42B may correspond to a blinking pattern that is formed by the plurality of light-emitting bodies 50 (the plurality of light-emitting units 52). Thus, the pedestrian and the like can more easily perceive a state of the road-to-vehicle communication between the group of vehicles G and the traffic infrastructure equipment 70 by seeing a situation where the illumination pattern formed by the group of vehicles G corresponds to the illumination pattern formed by the plurality of light-emitting bodies 50.

Although the embodiment of the present invention has been described, it goes without saying that the technical scope of the present invention should not be interpreted limitedly by the description of the embodiment. It will be understood by one skilled in the art that the embodiment is just exemplary and that the embodiment can be diversely changed within the scope of the invention defined in the claims. The technical scope of the present invention should be determined based on the scope of the invention defined in the claims and its equivalent scope.

In the embodiment, the driving mode of the vehicle includes the full-automatic driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the automatic driving in each country. Likewise, the definitions of "the full-automatic driving mode", "the advanced driving support mode" and "the driving support mode" described in the embodiment are just examples, and can be appropriately changed, in accordance with laws or rules relating to the automatic driving in each country.

The subject application is based on Japanese Patent Application No. 2015-249881 filed on Dec. 22, 2015, the contents of which are incorporated herein by reference.

The invention claimed is:

1. A vehicle illumination device provided to a vehicle capable of traveling in an automatic driving mode, the vehicle illumination device comprising:
an illumination unit provided on the vehicle and configured to irradiate light toward an exterior of the vehicle; and
an illumination control unit configured to control the illumination unit based on an illumination control signal transmitted from a traffic infrastructure equipment including a light-emitting body configured to irradiate light toward an exterior of the infrastructure equipment, such that an illumination state of the illumination unit matches an illumination state of the light-emitting body of the traffic infrastructure equipment in order to visually signal that the vehicle and the traffic infrastructure equipment are in communication with each other, the light-emitting body provided on the traffic infrastructure equipment,
wherein the light-emitting body is installed on a road.

2. The vehicle illumination device according to claim 1, wherein the illumination control unit is configured to control the illumination unit to blink in synchronization with the light-emitting body.

3. The vehicle illumination device according to claim 1, wherein the illumination control unit is configured to control the illumination unit such that an illumination color of the illumination unit corresponds to an illumination color of the light-emitting body.

4. A vehicle capable of traveling in an automatic driving mode, the vehicle comprising:
the vehicle illumination device according to claim 1;
a first wireless communication unit configured to receive the illumination control signal; and
a vehicle control unit configured to control traveling of the vehicle.

5. An illumination control system comprising:
the vehicle according to claim 4; and
the traffic infrastructure equipment including:
the light-emitting body including a light-emitting unit configured to irradiate light toward an exterior of the traffic infrastructure equipment; and
a communication device including a control signal generation unit configured to generate the illumination control signal and a second wireless communication unit configured to wirelessly transmit the illumination control signal.

6. The illumination control system according to claim 5, wherein the light-emitting body further includes:
a third wireless communication unit configured to receive the illumination control signal; and
a light emission control unit configured to control the light-emitting unit based on the illumination control signal such that an illumination state of the light-emitting unit corresponds to an illumination state of the illumination unit.

7. The illumination control system according to claim 5, wherein when the vehicle exists within a predetermined range from the communication device, the first wireless communication unit is able to receive the illumination control signal from the second wireless communication unit.

8. The illumination control system according to claim 7, wherein the light-emitting body is arranged at an intersection point or in the vicinity thereof, and
wherein the communication device is arranged in the vicinity of the intersection point.

9. The illumination control system according to claim 5, wherein the vehicle is a group of vehicles traveling in a row traveling mode,
wherein the light-emitting body is arranged in plural at an outer side of a road on which the group of vehicles is traveling, and
wherein the illumination control unit of each vehicle is configured to control the corresponding illumination unit such that an illumination pattern formed by the illumination units of the group of vehicles corresponds to an illumination pattern formed by the light-emitting units of the plurality of light-emitting bodies.

* * * * *